(12) United States Patent
Schmisseur et al.

(10) Patent No.: US 10,469,252 B2
(45) Date of Patent: Nov. 5, 2019

(54) TECHNOLOGIES FOR EFFICIENTLY MANAGING ALLOCATION OF MEMORY IN A SHARED MEMORY POOL

(71) Applicant: Intel Corporation, Santa Clara, CA (US)

(72) Inventors: Mark Schmisseur, Phoenix, AZ (US); Dimitrios Ziakas, Hillsboro, OR (US); Murugasamy K. Nachimuthu, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 67 days.

(21) Appl. No.: 15/856,173

(22) Filed: Dec. 28, 2017

(65) Prior Publication Data
US 2019/0042122 A1 Feb. 7, 2019

Related U.S. Application Data

(60) Provisional application No. 62/584,401, filed on Nov. 10, 2017.

(30) Foreign Application Priority Data

Aug. 30, 2017 (IN) .............................. 201741030632

(51) Int. Cl.
*H04L 9/08* (2006.01)
*G06F 3/06* (2006.01)
(Continued)

(52) U.S. Cl.
CPC .......... *H04L 9/0819* (2013.01); *G06F 3/0604* (2013.01); *G06F 3/065* (2013.01);
(Continued)

(58) Field of Classification Search
CPC .............. G06F 3/0631; G06F 11/3006; G06F 11/3037; G06F 12/02
See application file for complete search history.

(56) References Cited

U.S. PATENT DOCUMENTS 7,707,199 B2 * 4/2010 Shinohara ........... H04L 67/1097
707/705
8,868,868 B1 * 10/2014 Maheshwari ....... G06F 12/1475
711/164
(Continued)

*Primary Examiner* — Ryan Bertram
(74) *Attorney, Agent, or Firm* — Barnes & Thornburg LLP

(57) ABSTRACT

Technologies for efficiently managing the allocation of memory in a shared memory pool include a memory sled. The memory sled includes a memory pool of byte-addressable memory devices. The memory sled also includes a memory pool controller coupled to the memory pool. The memory pool controller receives a request to provision memory to a compute sled. Further, the memory pool controller maps, in response to the request, each of the memory devices of the memory pool to the compute sled. The memory pool controller additionally assigns access rights to the compute sled as a function of one or more memory characteristics of the compute sled. The memory characteristics are indicative of an amount of memory in the memory pool to be used by the compute sled and the access rights are indicative of access permissions to one or more memory address ranges associated with the one or more memory devices.

25 Claims, 17 Drawing Sheets

(51) Int. Cl.

| | | |
|---|---|---|
| G11C 29/36 | (2006.01) | |
| G11C 29/38 | (2006.01) | |
| G11C 29/44 | (2006.01) | |
| G06F 16/22 | (2019.01) | |
| G06F 16/2455 | (2019.01) | |
| G06F 12/02 | (2006.01) | |
| G06F 12/14 | (2006.01) | |
| G06F 13/16 | (2006.01) | |
| G06F 15/173 | (2006.01) | |
| G06F 13/40 | (2006.01) | |
| G06F 13/42 | (2006.01) | |
| G06F 9/448 | (2018.01) | |
| G06F 9/28 | (2006.01) | |
| G06F 15/16 | (2006.01) | |
| H04L 12/24 | (2006.01) | |
| H04L 29/06 | (2006.01) | |
| H04L 29/08 | (2006.01) | |
| H04L 12/703 | (2013.01) | |
| H04L 12/743 | (2013.01) | |
| H04L 12/801 | (2013.01) | |
| H04L 12/803 | (2013.01) | |
| H04L 12/935 | (2013.01) | |
| H04L 12/931 | (2013.01) | |
| G06F 9/4401 | (2018.01) | |
| G06F 9/445 | (2018.01) | |
| G06F 12/06 | (2006.01) | |
| G06F 16/23 | (2019.01) | |
| G06F 16/248 | (2019.01) | |
| G06F 16/901 | (2019.01) | |
| G06F 9/50 | (2006.01) | |
| G06F 17/50 | (2006.01) | |
| G06F 16/25 | (2019.01) | |
| G06F 16/2453 | (2019.01) | |
| G06F 16/11 | (2019.01) | |
| H04L 12/861 | (2013.01) | |
| G11C 8/12 | (2006.01) | |
| G11C 29/02 | (2006.01) | |
| G06F 12/0802 | (2016.01) | |
| G06F 12/1045 | (2016.01) | |

(52) U.S. Cl.
CPC ............ *G06F 3/0605* (2013.01); *G06F 3/067* (2013.01); *G06F 3/0611* (2013.01); *G06F 3/0613* (2013.01); *G06F 3/0629* (2013.01); *G06F 3/0631* (2013.01); *G06F 3/0632* (2013.01); *G06F 3/0644* (2013.01); *G06F 3/0647* (2013.01); *G06F 3/0659* (2013.01); *G06F 3/0673* (2013.01); *G06F 3/0683* (2013.01); *G06F 3/0685* (2013.01); *G06F 9/28* (2013.01); *G06F 9/445* (2013.01); *G06F 9/4406* (2013.01); *G06F 9/4411* (2013.01); *G06F 9/4494* (2018.02); *G06F 9/5044* (2013.01); *G06F 9/5088* (2013.01); *G06F 12/023* (2013.01); *G06F 12/06* (2013.01); *G06F 12/0607* (2013.01); *G06F 12/14* (2013.01); *G06F 13/1663* (2013.01); *G06F 13/1668* (2013.01); *G06F 13/4068* (2013.01); *G06F 13/42* (2013.01); *G06F 15/161* (2013.01); *G06F 15/17331* (2013.01); *G06F 16/119* (2019.01); *G06F 16/221* (2019.01); *G06F 16/2237* (2019.01); *G06F 16/2255* (2019.01); *G06F 16/2282* (2019.01); *G06F 16/2365* (2019.01); *G06F 16/248* (2019.01); *G06F 16/2453* (2019.01); *G06F 16/2455* (2019.01); *G06F 16/24553* (2019.01); *G06F 16/25* (2019.01); *G06F 16/9014* (2019.01); *G06F 17/5054* (2013.01); *G11C 8/12* (2013.01); *G11C 29/028* (2013.01); *G11C 29/36* (2013.01); *G11C 29/38* (2013.01); *G11C 29/44* (2013.01); *H04L 9/0894* (2013.01); *H04L 41/0213* (2013.01); *H04L 41/0668* (2013.01); *H04L 41/0677* (2013.01); *H04L 41/0893* (2013.01); *H04L 41/0896* (2013.01); *H04L 45/28* (2013.01); *H04L 45/7453* (2013.01); *H04L 47/11* (2013.01); *H04L 47/125* (2013.01); *H04L 49/30* (2013.01); *H04L 49/351* (2013.01); *H04L 49/9005* (2013.01); *H04L 69/12* (2013.01); *H04L 69/22* (2013.01); *H04L 69/32* (2013.01); *H04L 69/321* (2013.01); *G06F 12/0802* (2013.01); *G06F 12/1054* (2013.01); *G06F 12/1063* (2013.01); *G06F 2201/85* (2013.01); *G06F 2209/509* (2013.01); *G06F 2212/1044* (2013.01); *G06F 2212/1052* (2013.01); *G06F 2212/601* (2013.01); *G06F 2213/0064* (2013.01)

(56) References Cited

U.S. PATENT DOCUMENTS

| | | | |
|---|---|---|---|
| 2007/0113041 A1* | 5/2007 | Sakashita | G06F 3/0605 711/170 |
| 2012/0131301 A1* | 5/2012 | Maeda | G06F 3/0611 711/171 |
| 2018/0077235 A1* | 3/2018 | Nachimuthu | H04L 47/70 |
| 2018/0089044 A1* | 3/2018 | Guim Bernat | G06F 11/2069 |
| 2018/0196608 A1* | 7/2018 | Ahmed | G06F 3/061 |
| 2018/0285003 A1* | 10/2018 | Richardson | G06F 3/0622 |

* cited by examiner

TECHNOLOGIES FOR EFFICIENTLY MANAGING ALLOCATION OF MEMORY IN A SHARED MEMORY POOL

CROSS-REFERENCE TO RELATED APPLICATIONS

The present application claims the benefit of Indian Provisional Patent Application No. 201741030632, filed Aug. 30, 2017 and U.S. Provisional Patent Application No. 62/584,401, filed Nov. 10, 2017.

BACKGROUND

In systems that distribute workloads among multiple compute devices (e.g., in a data center), a centralized server may manage resources allocated to each compute device to efficiently process the workload. In allocating a resource for use by a compute device, the allocation process can consume a significant amount of time, as one or more hardware devices may need to be reinitialized (e.g., reset) to accommodate the remote compute device that is to access the resource. The time consumed in allocating a resource to a compute device in a data center may add latency to the execution of the corresponding workload and potentially result in a violation of a service level agreement (e.g., a set of target performance metrics, such as a speed at which the workload is to be executed, etc.) with a customer associated with the workload.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
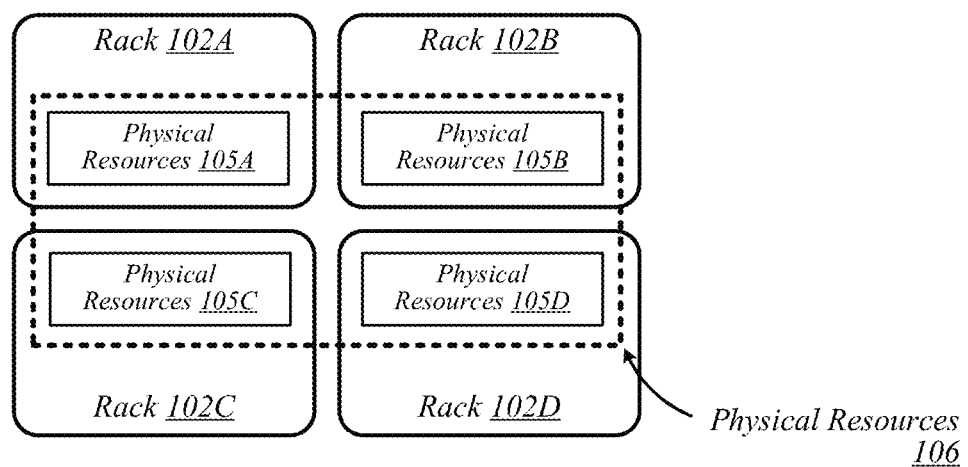
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources (PCRs) 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed for increased thermal performance In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, ASICs, etc.), and data storage drives that are physically disaggregated, and provide them to compute resources (e.g., processors) on an as needed basis, enabling the compute resources to access the pooled resources as if they were local. The illustrative data center 100 additionally receives utilization information for the various resources, predicts resource utilization for different types of workloads based on past resource utilization, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
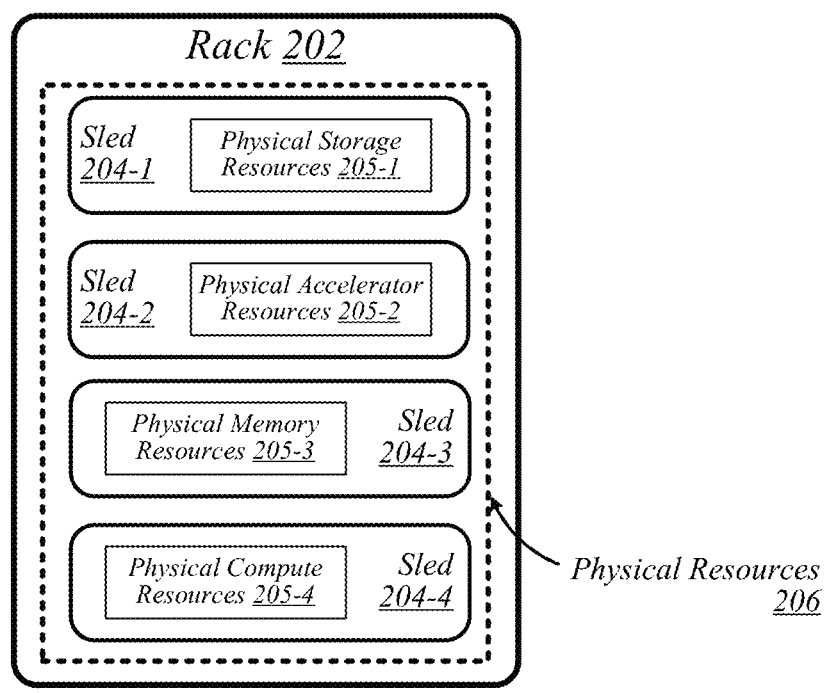
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-4 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulatable sleds comprising disaggregated resources, each type of resource can be upgraded independently of each other and at their own optimized refresh rate.

Figure 3:
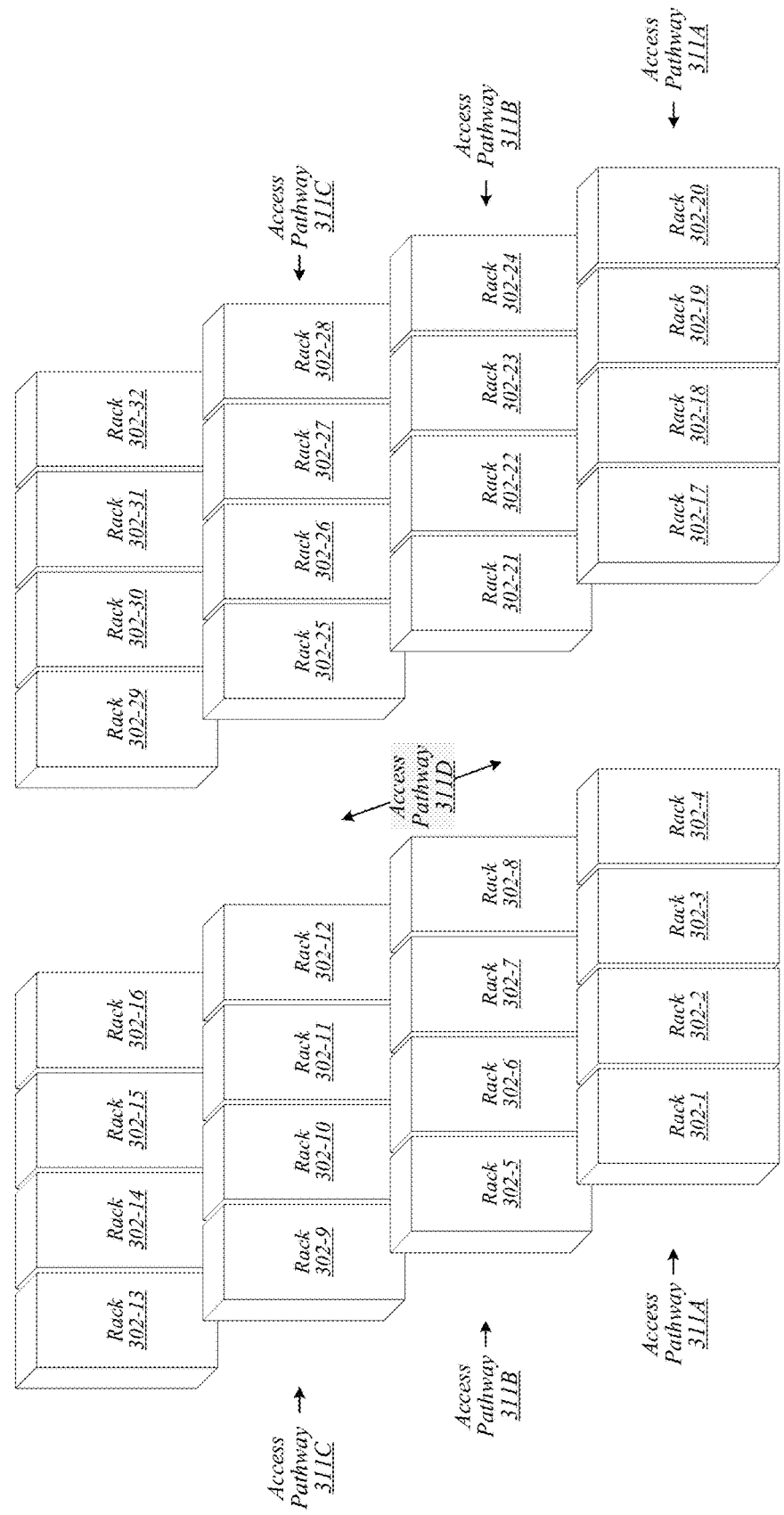
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
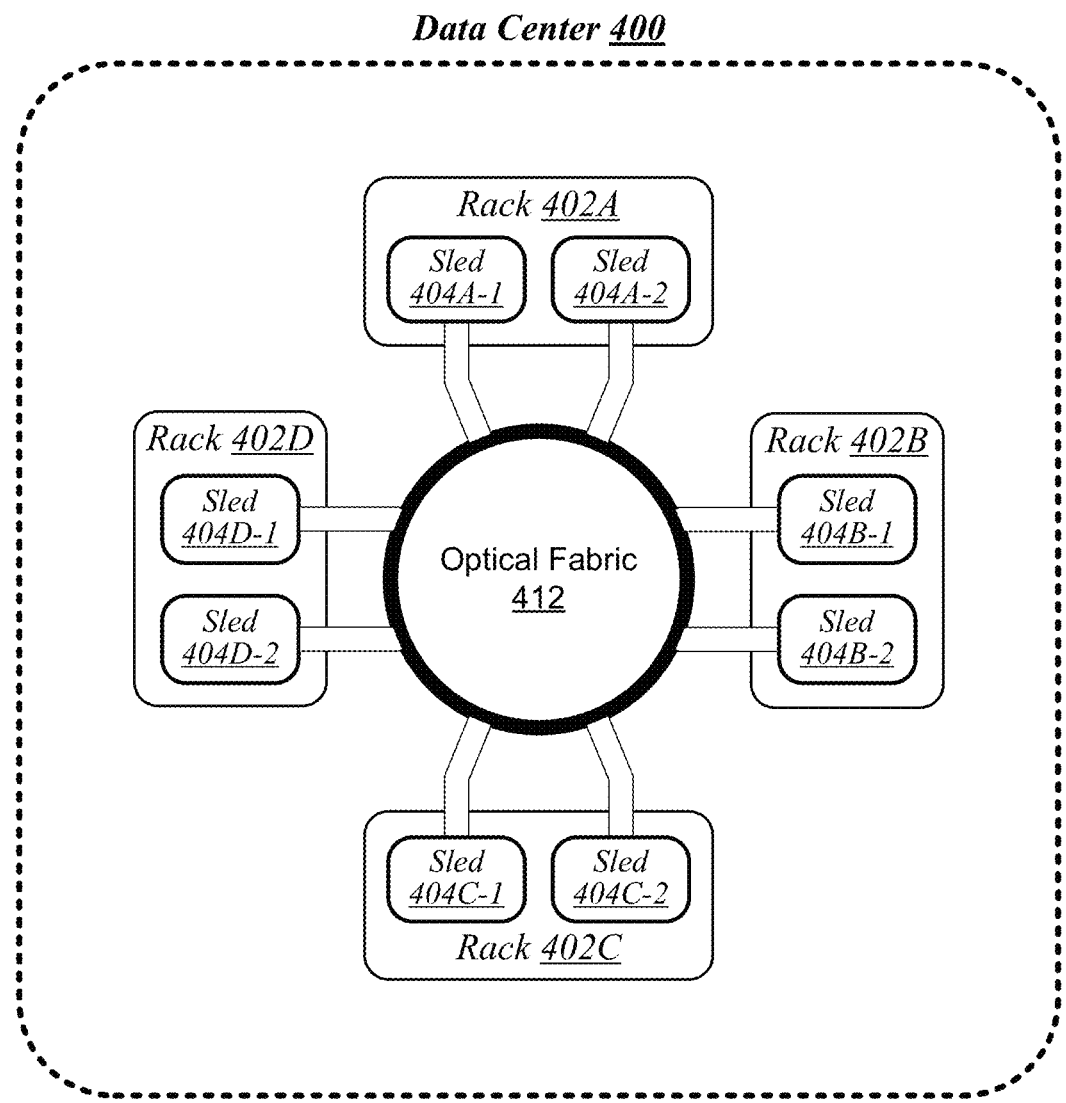
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
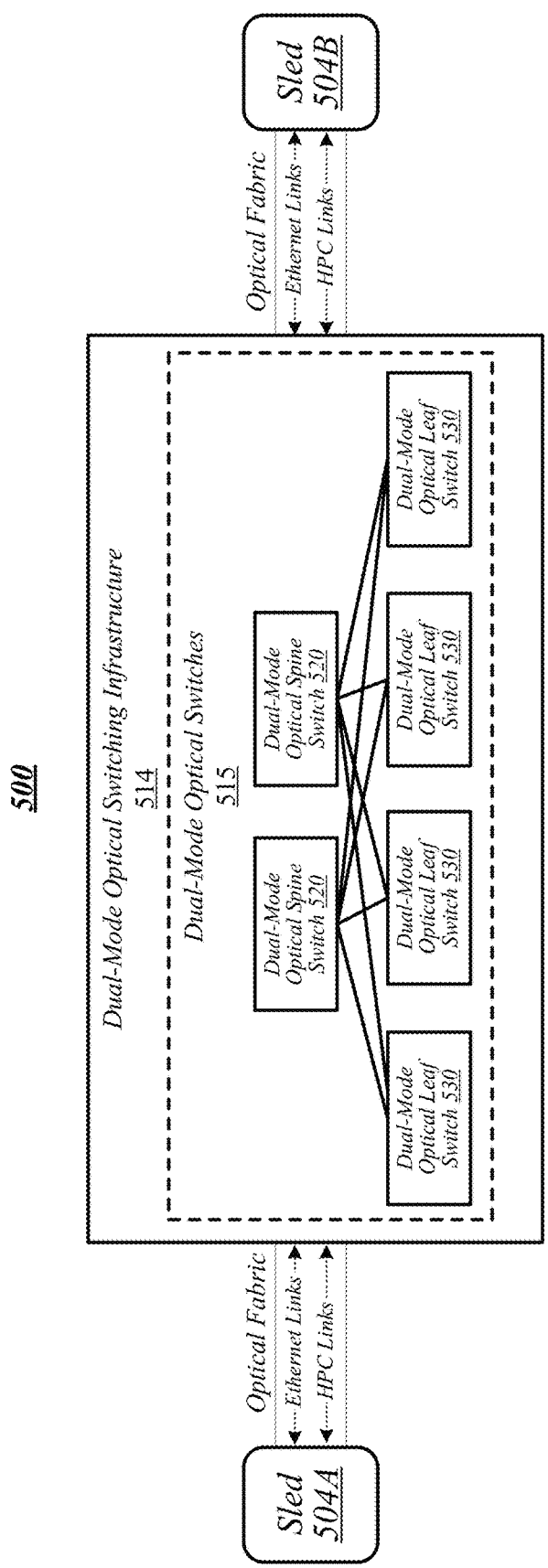
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, InfiniBand™) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
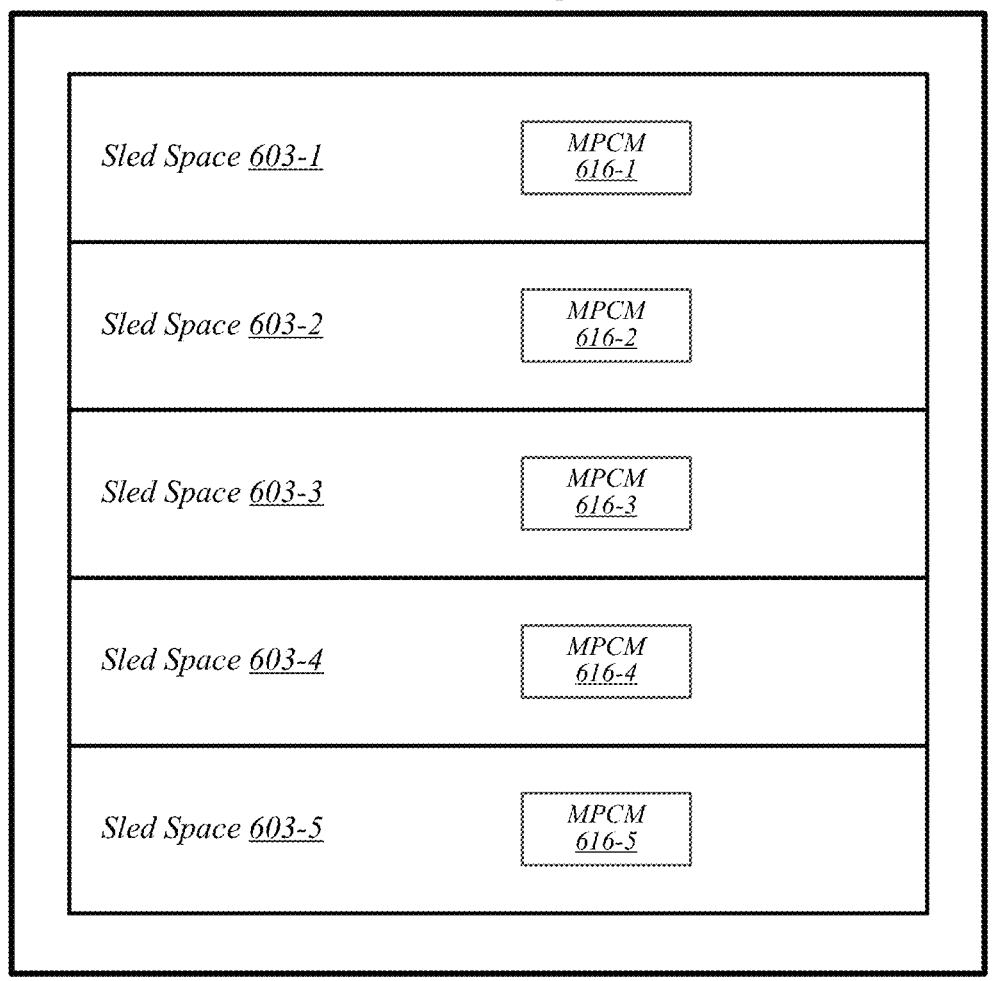
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
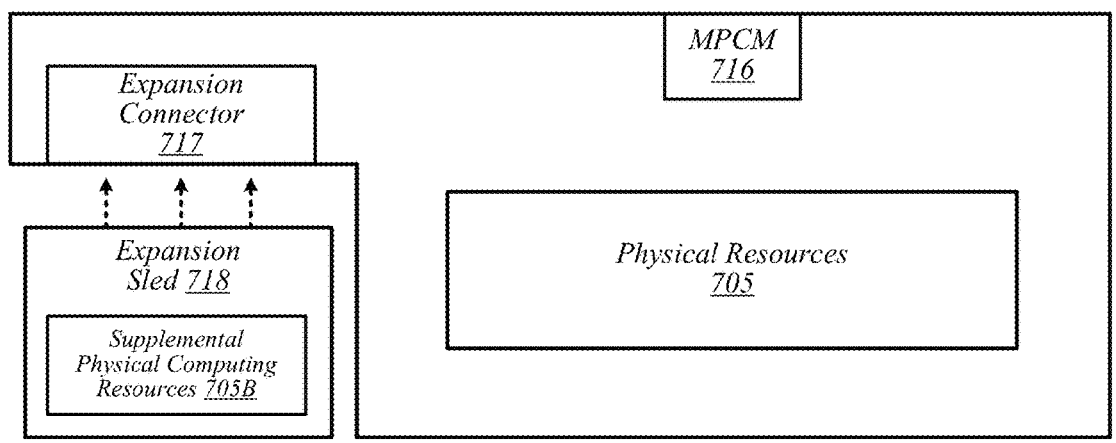
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
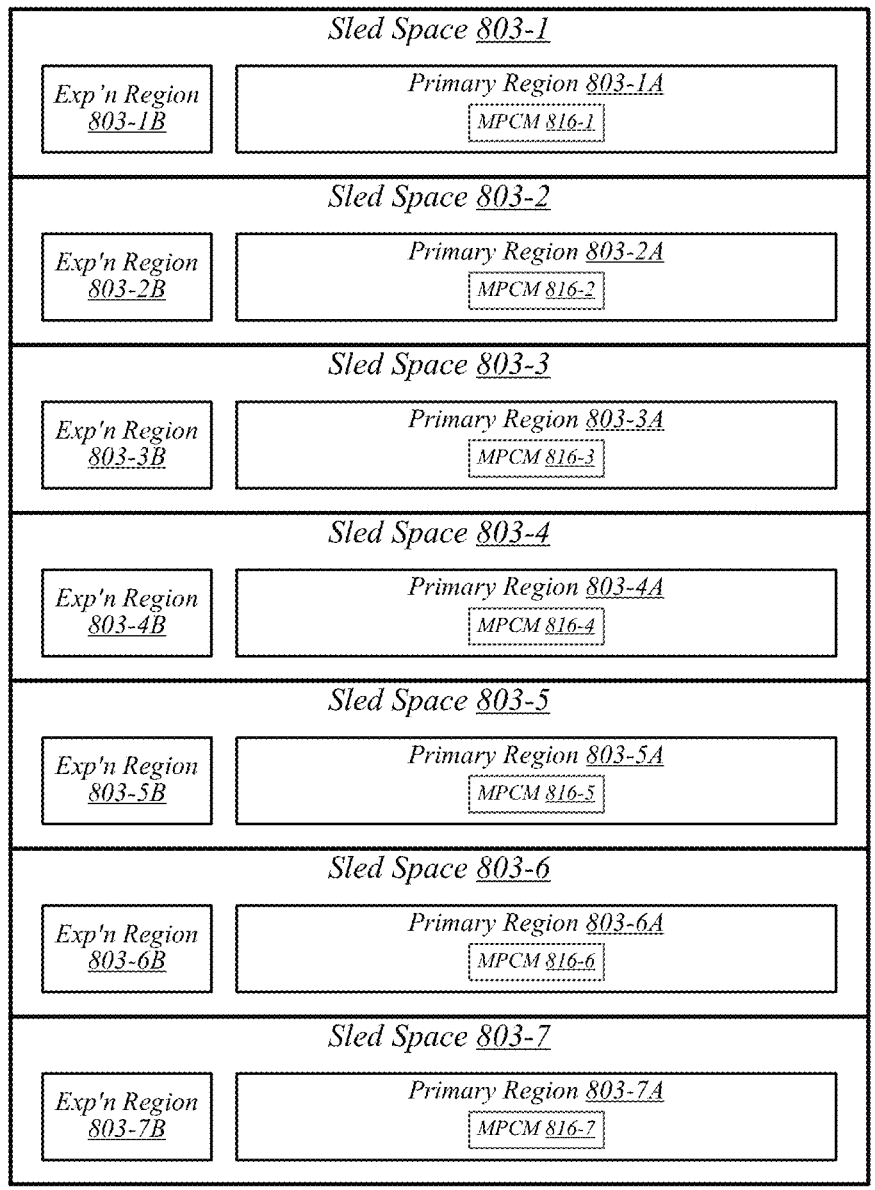
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
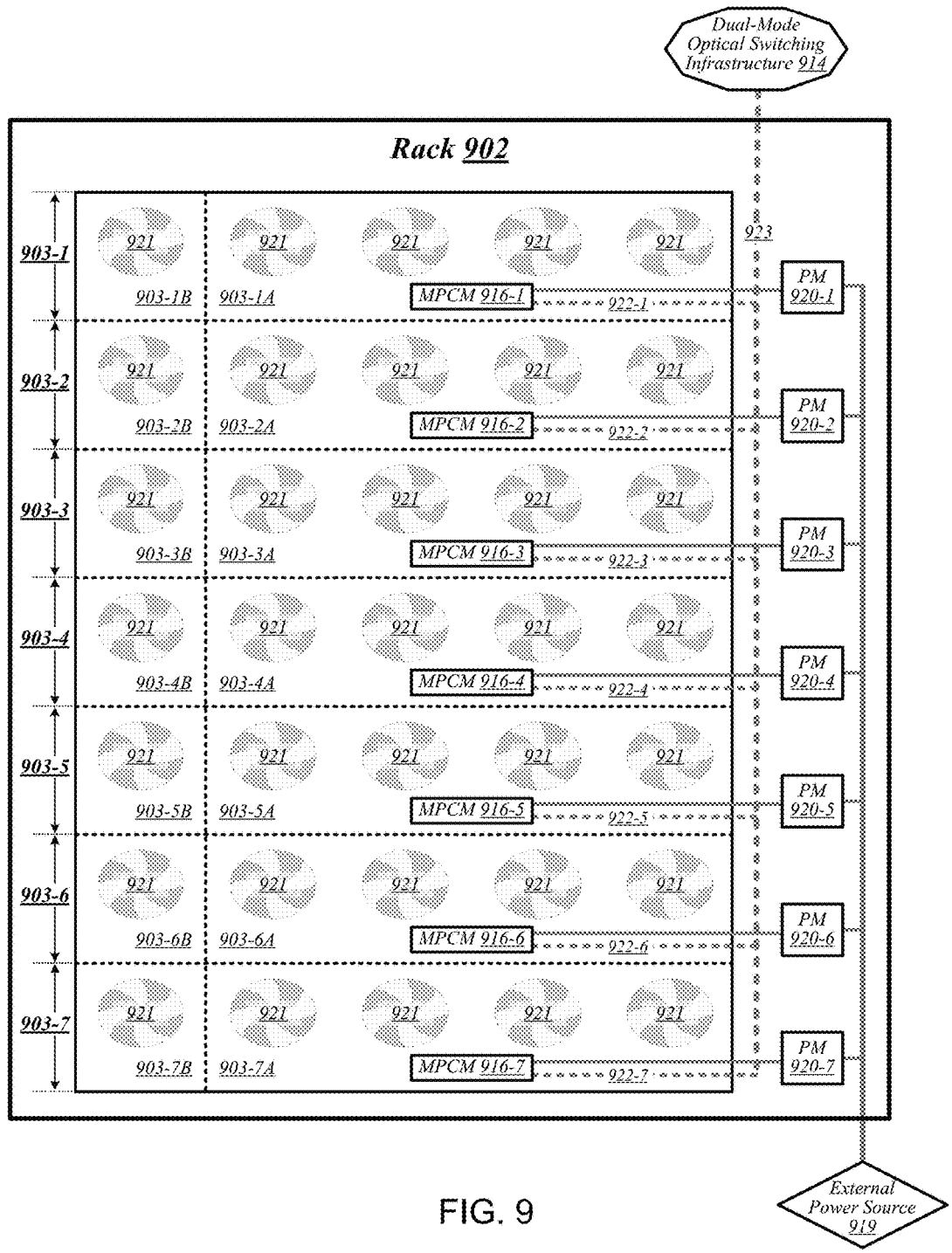
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 921 that are generally arranged to provide air cooling within the various sled spaces 903-1 to 903-7. In some embodiments, the height of the sled space is greater than the conventional "1U" server height. In such embodiments, fans 921 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 919. In various embodiments, external power source 919 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
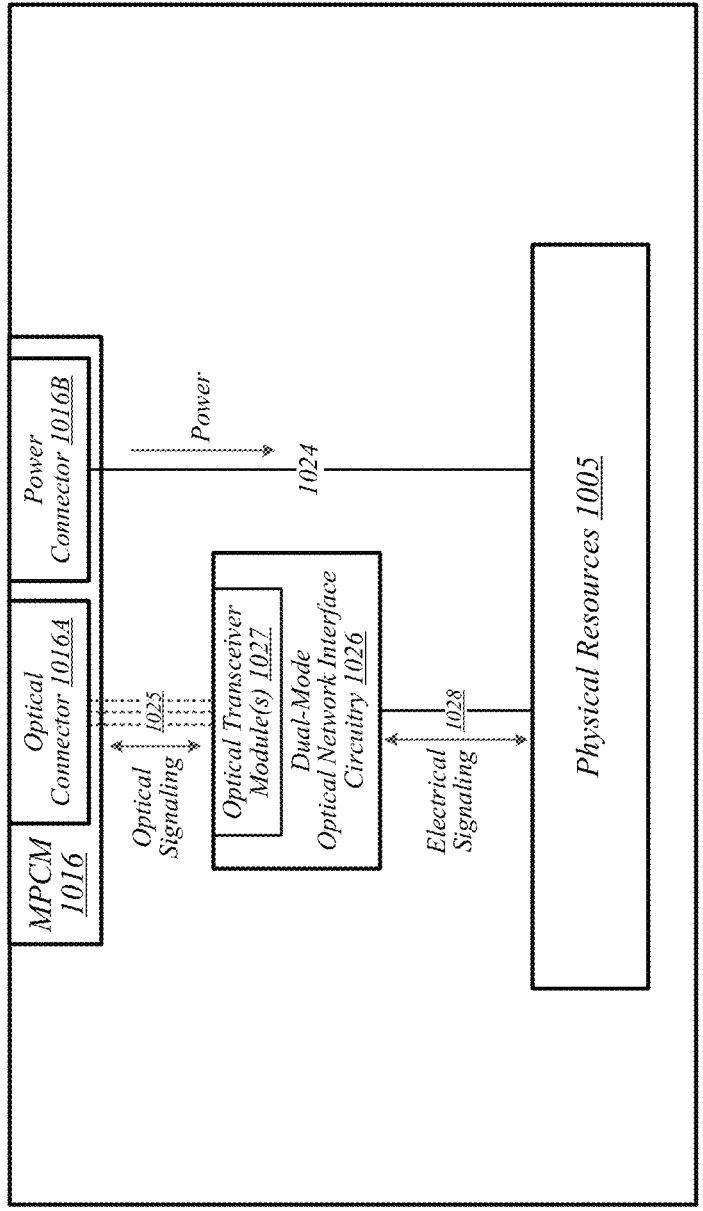
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heatpipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
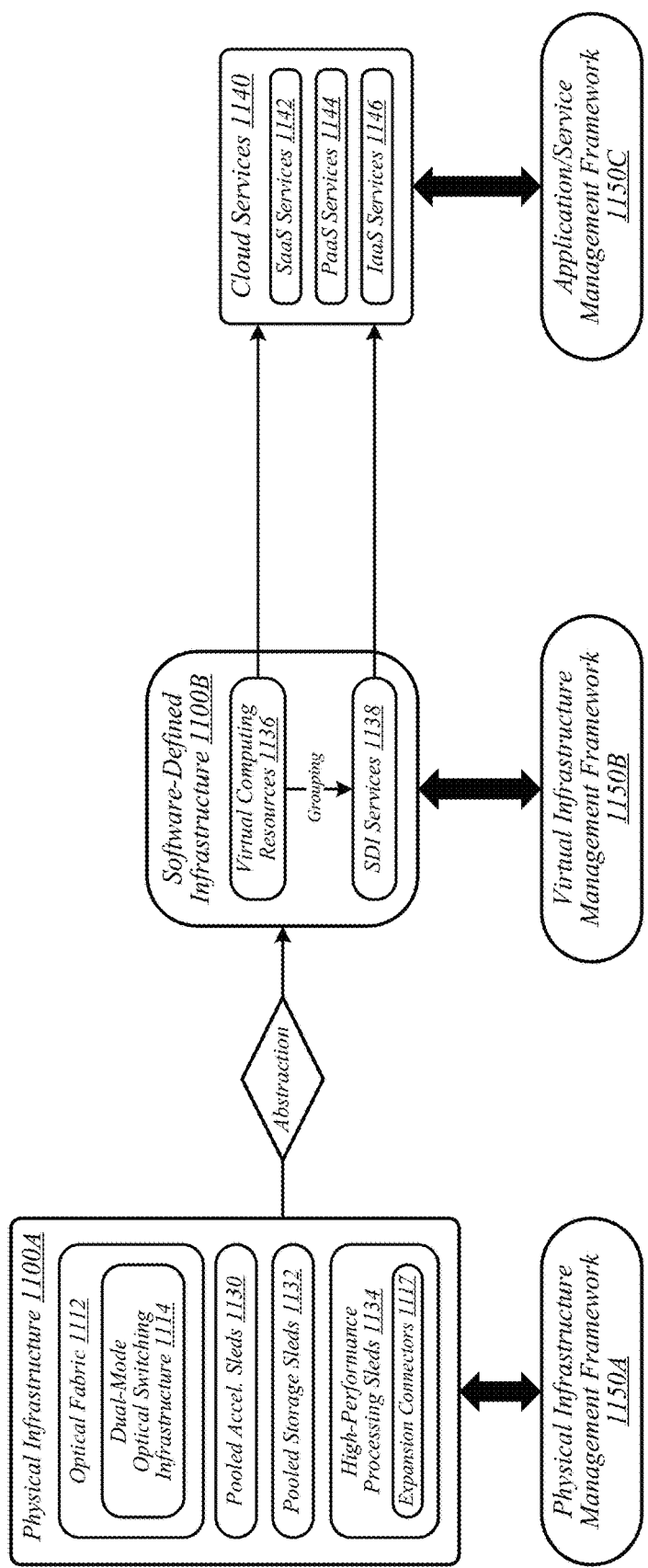
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to— optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of software-defined infrastructure (SDI) services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide QoS management capabilities for cloud services 1140. The embodiments are not limited in this context.

Figure 12:
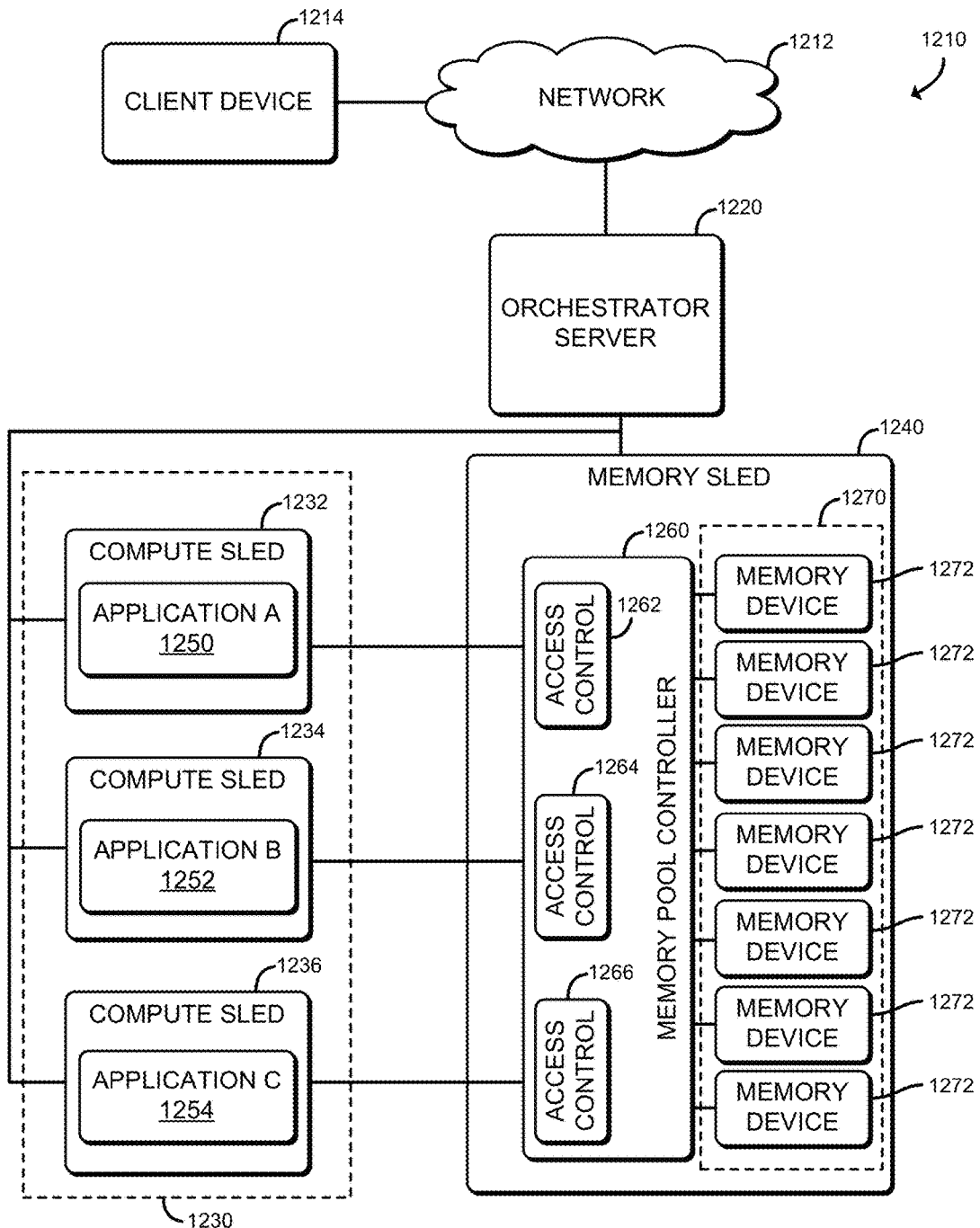
FIG. 12 is a simplified block diagram of at least one embodiment of a system for dynamically allocating additional memory to a compute sled.

Referring now to FIG. 12, a system 1210 for managing allocation of memory capacity to a compute sled may be implemented in accordance with the data centers 100, 300, 400, 1100 described above with reference to FIGS. 1, 3, 4, and 11. In the illustrative embodiment, the system 1210 includes an orchestrator server 1220 communicatively coupled to multiple sleds. The sleds include a set of compute sleds 1230, which includes compute sleds 1232, 1234, and 1236, and a memory sled 1240. The memory sled 1240 includes a memory pool controller 1260 connected to multiple byte-addressable memory devices 1272 that, together, form a memory pool 1270. The memory pool controller 1260 includes access control logic units 1262, 1264, 1266 that, in the illustrative embodiment, selectively provide access to memory within the memory pool 1270 to the compute sleds 1230, for use by applications 1250, 1252, 1254 executed by the compute sleds 1230. One or more of the sleds 1230 or 1240 may be grouped into a managed node, such as by the orchestrator server 1220, to collectively perform one or more workloads (e.g., an application 1250, 1252, 1254), such as in virtual machines or containers, on behalf of a user of the client device 1214. A managed node may be embodied as an assembly of resources (e.g., physical resources 206), such as compute resources (e.g., physical compute resources 205-4), memory resources (e.g., physical memory resources 205-3), storage resources (e.g., physical storage resources 205-1), or other resources (e.g., physical accelerator resources 205-2), from the same or different sleds (e.g., the sleds 204-1, 204-2, 204-3, 204-4, etc.) or racks (e.g., one or more of racks 302-1 through 302-32). Further, a managed node may be established, defined, or "spun up" by the orchestrator server 1220 at the time a workload is to be assigned to the managed node or at any other time, and may exist regardless of whether any workloads are presently assigned to the managed node. The orchestrator server 1220 may support a cloud operating environment, such as OpenStack.

In the illustrative embodiment, in operation, the memory sled 1240 establishes address spaces in the memory pool 1270 for use by each compute sled 1230 in the execution of the workloads 1250, 1252, 1254. In doing so, the memory sled 1240 may enable multiple of the compute sleds 1230 to access the same memory regions (e.g., memory at the same physical memory address), thereby eliminating the requirement for the compute sleds 1230 to maintain local copies of the data in their local memory. Conversely, the memory sled 1240 may exclude compute devices 1230 from accessing certain data in the memory that (e.g., data utilized by a workload 1254 that is unrelated to the workloads 1250, 1252). As such, the system 1210 enables more efficient use of memory among multiple compute devices (e.g., compute sled 1230) in a data center as compared to typical systems.

As further described herein, embodiments presented herein provide techniques for efficiently managing the allocation of memory to the compute sleds 1230 from the memory pool 1270. In some embodiments, the memory sled 1240 may map the entire memory pool 1270 to a given compute sled 1230. More particularly, the memory sled 1240 maps each memory device of the memory pool 1270 to the compute sled 1230. Thereafter, the memory sled 1240 may set access permissions (e.g., read and/or write permissions) to memory regions in the memory pool 1270 for the compute sled, according to memory characteristics associated with the compute sled 1230 (e.g., memory requirements based on the workload, service level agreement (SLA) requirements, a predefined Quality of Service (QoS), etc.). Doing so effectively allocates a selected subset of the total address regions of the memory pool 1270 to the compute sled 1230 much faster than a performing a typical allocation or deallocation process (e.g., mapping of addresses, moving of data to accommodate an allocated memory region, potentially resetting one or more memory devices 1272, etc.). Further, the memory sled 1240 may manage (e.g., selectively increase or decrease) an amount of memory available to the compute sled 1230, (e.g., based on changes in memory characteristics). For instance, the memory sled 1240 may receive a request from the compute sled 1230 for additional memory. In such a case, because each of the memory devices of the memory pool 1270 are already mapped to the compute sled 1230, the memory sled 1240 may modify the access permissions to avail additional memory address ranges to the compute sled 1230 (also referred to herein as "onlining" memory for the compute sled 1230). As a result, the compute sled 1230 may use the memory without needing to perform a reset of components in the memory sled 1240 or the compute sled 1230 itself.

Figure 13:
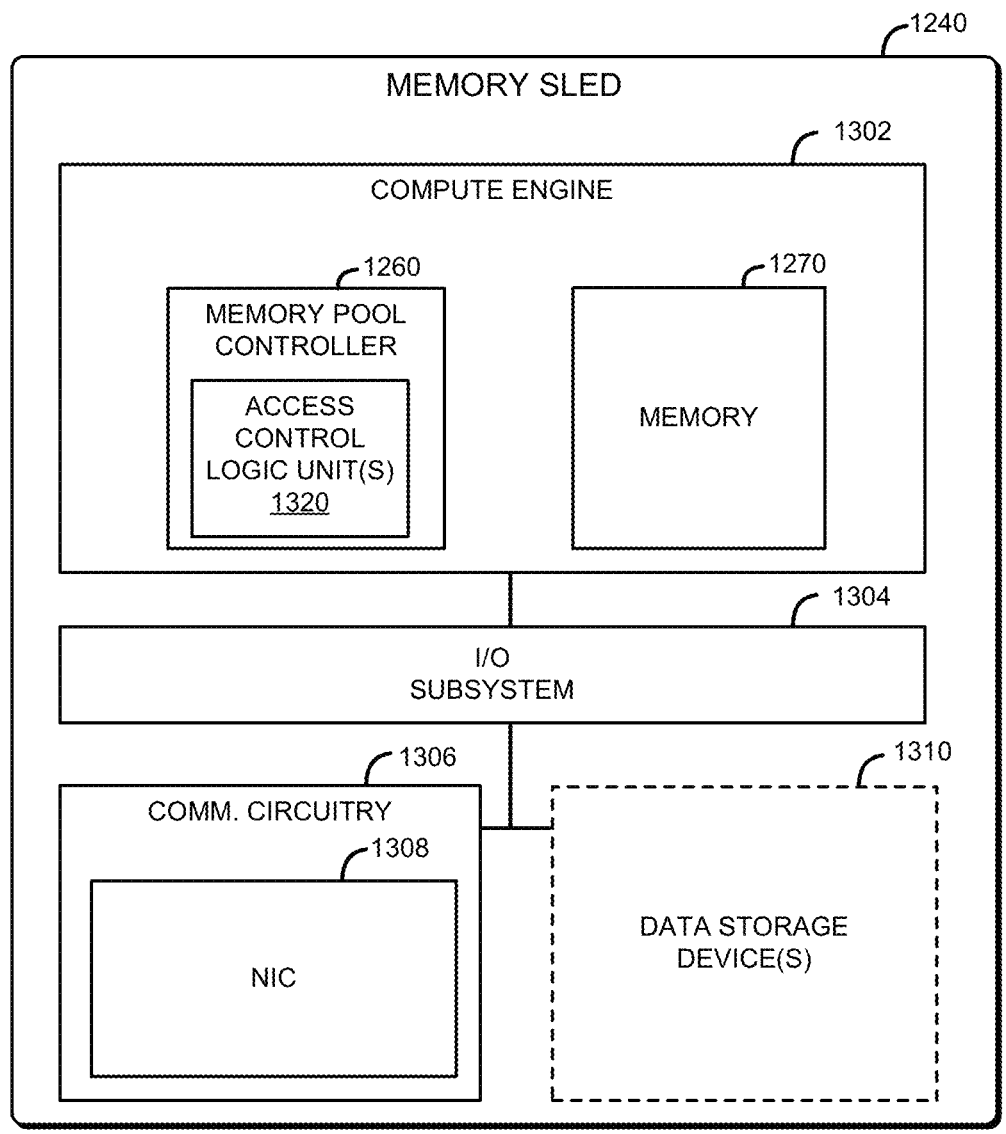
FIG. 13 is a simplified block diagram of at least one embodiment of a memory sled of the system of FIG. 12.

Referring now to FIG. 13, the memory sled 1240 may be embodied as any type of compute device capable of performing the functions described herein, including receiving a request to provision memory to a compute sled (e.g., one of the compute sleds 1230), mapping each of the memory devices of the memory pool 1270 to the compute sled, and assigning access rights data (e.g., access permissions to one or more memory address ranges associated with the memory devices, where the access permissions can include, for example, read-only, read-write, shared read-only or shared read-write permissions) to the compute sled as a function of one or more memory characteristics of the compute sled (e.g., characteristics that are indicative of an amount of memory in the memory pool 1270 to be used by the compute sled).

As shown in FIG. 13, the illustrative memory sled 1240 includes a compute engine 1302, an input/output (I/O) subsystem 1304, and communication circuitry 1306. Of course, in other embodiments, the memory sled 1240 may include other or additional components, such as those commonly found in a computer (e.g., display, peripheral devices, etc.). Additionally, in some embodiments, one or more of the illustrative components may be incorporated in, or otherwise form a portion of, another component.

The compute engine 1302 may be embodied as any type of device or collection of devices capable of performing various compute functions described below. In some embodiments, the compute engine 1302 may be embodied as a single device such as an integrated circuit, an embedded system, a field-programmable gate array (FPGA), a system-on-a-chip (SOC), or other integrated system or device. In the illustrative embodiment, the compute engine 1302 includes or is embodied as the memory pool controller 1260 and the memory pool 1270 (also referred to herein as memory). The memory pool controller 1260 may be embodied as any type of device or circuitry capable of performing the functions described herein. For example, the memory pool controller 1260 may be embodied as a single or multi-core processor (s), a microcontroller, or other processor or processing/controlling circuit. In some embodiments, the memory pool controller 1260 may be embodied as, include, or be coupled to an FPGA, an application specific integrated circuit (ASIC), reconfigurable hardware or hardware circuitry, or other specialized hardware to facilitate performance of the functions described herein. In the illustrative embodiment, the memory pool controller 1260 includes one or more access control logic units 1320, similar to the access control logic units 1262, 1264, 1266. The access control logic units 1320 may be embodied as any device or circuitry (e.g., processor(s), ASICs, FPGAs, etc.) capable of selectively enabling access (e.g., read access and/or write access) to regions (also referred to herein as "memory address ranges") of the memory 1270 to each compute sled 1230.

The memory 1270 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include future generation nonvolatile devices, such as a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the memory 1270 may be integrated into the memory pool controller 1260. In operation, the memory 1270 may store various software and data used during operation such as memory map data, access rights data, workload data, applications, programs, and libraries.

The compute engine 1302 is communicatively coupled to other components of the memory sled 1240 via the I/O subsystem 1304, which may be embodied as circuitry and/or components to facilitate input/output operations with the compute engine 1302 (e.g., with the memory pool controller 1260 and/or the memory 1270) and other components of the memory sled 1240. For example, the I/O subsystem 1304 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 1304 may form a portion of a system-on-a-chip (SoC) and be incorporated, along with one or more of the memory pool controller 1260, the memory 1270, and other components of the memory sled 1240, into the compute engine 1302.

The communication circuitry 1306 may be embodied as any communication circuit, device, or collection thereof, capable of enabling communications over the network 1212 between the memory sled 1240 and another compute device (e.g., the compute sleds 1230, the orchestrator server 1220). The communication circuitry 1306 may be configured to use any one or more communication technology (e.g., wired or wireless communications) and associated protocols (e.g., Ethernet, Bluetooth®, Wi-Fi®, WiMAX, etc.) to effect such communication.

The communication circuitry 1306 may include a network interface controller (NIC) 1308, which may also be referred to as a host fabric interface (HFI). The NIC 1308 may be embodied as one or more add-in-boards, daughter cards, network interface cards, controller chips, chipsets, or other devices that may be used by the memory sled 1240 to connect with another compute device (e.g., the compute sleds 1230, the orchestrator server 1220, etc.). In some embodiments, the NIC 1308 may be embodied as part of a system-on-a-chip (SoC) that includes one or more processors, or included on a multichip package that also contains one or more processors. In some embodiments, the NIC 1308 may include a local processor (not shown) and/or a local memory (not shown) that are both local to the NIC 1308. In such embodiments, the local processor of the NIC 1308 may be capable of performing one or more of the functions of the compute engine 1302 described herein. Additionally or alternatively, in such embodiments, the local memory of the NIC 1308 may be integrated into one or more components of the memory sled 1240 at the board level, socket level, chip level, and/or other levels.

The memory sled 1240 may also include one or more data storage devices 1310, which may be embodied as any type of devices configured for short-term or long-term storage of data such as, for example, memory devices and circuits, memory cards, hard disk drives, solid-state drives, or other data storage devices. Each data storage device 1310 may include a system partition that stores data and firmware code for the data storage device 1310. Each data storage device 1310 may also include one or more operating system partitions that store data files and executables for operating systems.

The orchestrator server 1220, the compute sleds 1230, and the client device 1214 may have components similar to those described in FIG. 13. The description of those components of the memory sled 1240 is equally applicable to the description of components of those devices and is not repeated herein for clarity of the description. Further, it should be appreciated that any of the memory sled 1240, the compute sleds 1230, the orchestrator server 1220, or the client device 1214 may include other components, sub-components, and devices commonly found in a computing device, which are not discussed above in reference to the memory sled 1240 and not discussed herein for clarity of the description.

As described above, the orchestrator server 1220, the sleds 1230, 1240, and the client device 1214 are illustratively in communication via the network 1212, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

Figure 14:
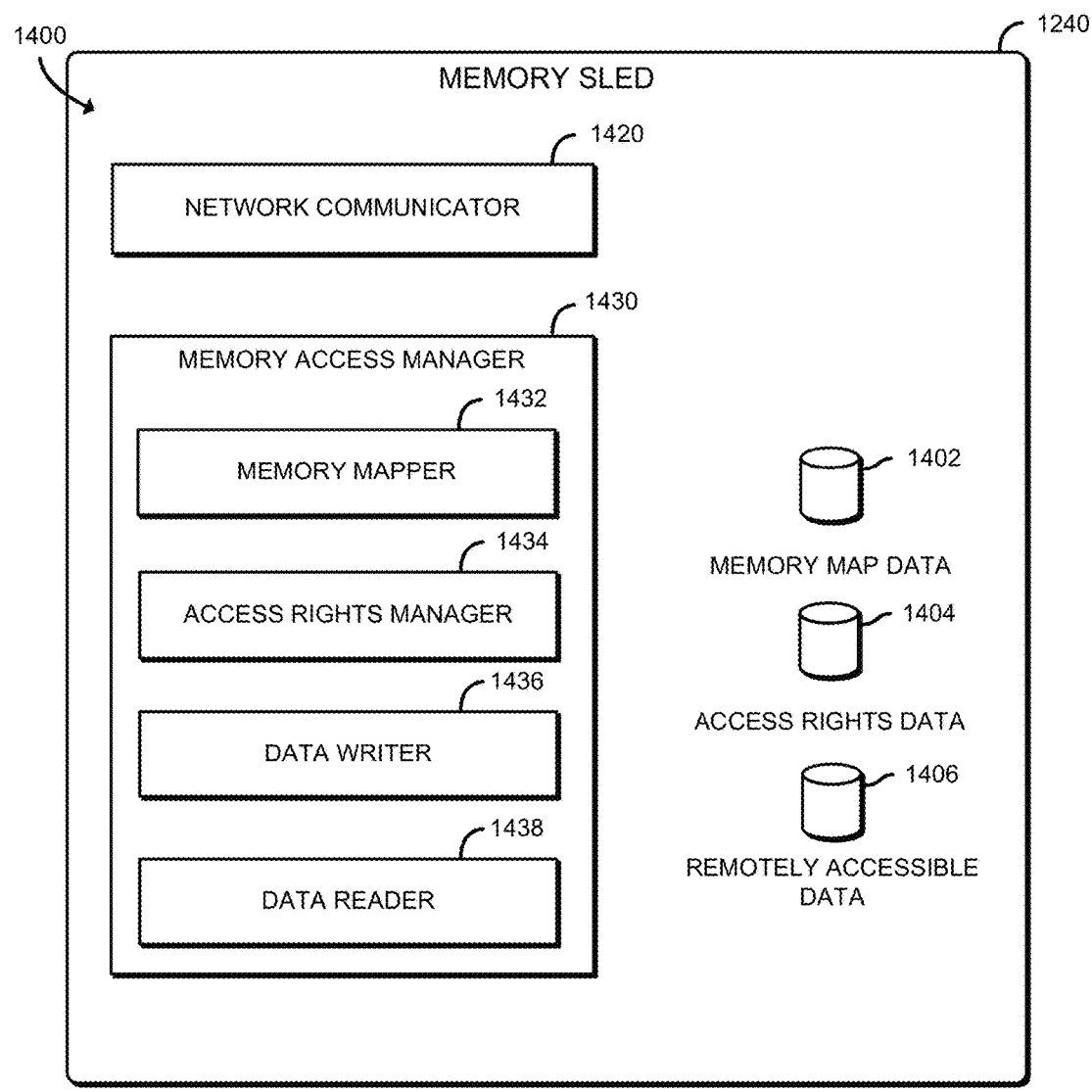
FIG. 14 is a simplified block diagram of at least one embodiment of an environment that may be established by the memory sled of FIGS. 12 and 13.

Referring now to FIG. 14, the memory sled 1240 may establish an environment 1400 during operation. The illustrative environment 1400 includes a network communicator 1420 and a memory access manager 1430. Each of the components of the environment 1400 may be embodied as hardware, firmware, software, or a combination thereof. As such, in some embodiments, one or more of the components of the environment 1400 may be embodied as circuitry or a collection of electrical devices (e.g., network communicator circuitry 1420, memory access manager circuitry 1430, etc.). It should be appreciated that, in such embodiments, one or more of the network communicator circuitry 1420 or memory access manager circuitry 1430 may form a portion of one or more of the compute engine 1302, the memory pool controller 1260, the memory 1270, the communication circuitry 1306, the I/O subsystem 1304 and/or other components of the memory sled 1240. In the illustrative embodiment, the environment 1400 includes memory map data 1402, which may be embodied as any data indicative of physical addresses of the memory 1270 and corresponding logical addresses (e.g., addresses used by the memory pool controller 1260 and the compute sleds 1230 that are mapped to all or a subset of the physical addresses). The environment 1400 also includes access rights data 1404, which may be embodied as permissions (e.g., read-only, read-write, shared read-only, shared read-write permissions) associated with one or more compute sleds 1230 indicative of whether a logical address is accessible (e.g., within a memory space of logical addresses) available to the compute sled 1230 for read and/or write access. The illustrative environment 1400 also includes remotely accessible data 1406 which may be embodied as any data present in the memory 1270 that is available to (e.g., within an address space) provided to one or more corresponding compute sleds 1230.

In the illustrative environment 1400, the network communicator 1420, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the memory sled 1240, respectively. To do so, the network communicator 1420 is configured to receive and process data packets from one system or computing device (e.g., a compute sled 1230, the orchestrator server 1220, etc.) and to prepare and send data packets to a computing device or system (e.g., a compute sled 1230, the orchestrator server 1220, etc.). Accordingly, in some embodiments, at least a portion of the functionality of the network communicator 1420 may be performed by the communication circuitry 1306, and, in the illustrative embodiment, by the NIC 1308.

The memory access manager 1430, which may be embodied as hardware, firmware, software, virtualized hardware, emulated architecture, and/or a combination thereof, is to dynamically allocate one or more memory address ranges of the memory pool 1270 to a compute sled 1230 based on memory characteristics (e.g., data indicative of an amount of byte-addressable memory that is to be used by the compute sled 1230 in the execution of one or more workloads) of the compute sled 1230 (e.g., resource usage targets of a workload to be executed on the compute sled 1230, service level agreement (SLA) performance targets, and the like) by initially mapping the entire memory pool 1270 to each compute device 1230 and then selectively providing access rights to each compute sled 1230 to a subset of the mapped memory pool 1270. To do so, the memory access manager 1430 includes a memory mapper 1432, an access rights manager 1434, a data writer 1436, and a data reader 1438.

The memory mapper 1432, in the illustrative embodiment, is configured to receive an allocation request from a remote compute device (e.g., a compute sled 1230 or the orchestrator server 1220) to allocate one or more regions of pooled byte-addressable memory (e.g., the memory 1270) to one or more compute sleds 1230 and produce address space data for each compute sled indicative of the pooled byte-addressable memory accessible to the compute sled. The pooled byte-addressable memory corresponds to each of the memory devices of the memory pool 1270 (e.g., the entire memory pool 1270). The memory mapper 1432 maps the address space data to the one or more compute sleds. Further, the memory mapper 1432 is configured to verify parameters of any memory access or allocation requests from the compute sled 1230.

The access rights manager 1434, in the illustrative embodiment, is configured to evaluate memory characteristics associated with the compute sled that may be provided with the request to allocate the one or more regions of byte-addressable memory. As described above, the memory characteristics may be embodied as any data indicative of an amount of memory in the memory pool 1270 to be used by the compute sled 1230. For example, memory characteristics may include memory usage targets for a workload to be executed by the compute sled 1230, specifications provided as an SLA, or memory access permissions of the compute sled 1230. In other cases, the request may specify an amount of memory to allocate. For example, the orchestrator server 1220 may determine the memory characteristics and include, in the request, the determined amount of memory with the request. As another example, the compute sled 1230 may also determine an amount of memory to be utilized during execution of a given workload.

The access rights manager 1434 is also configured to assign access permissions to the compute sled 1230 as a function of the evaluated memory characteristics. Such access permissions may include read-only, read-write, shared read only, and shared read-write permissions. For instance, the access rights manager 1434 may modify the access rights data 1404 associated with the compute sled 1230 and specify one or more address ranges of the byte-addressable memory mapped to the compute sled 1230 as accessible via read and/or write permissions. The access rights data 1404 may further include logical memory address ranges for use by the compute sled 1230 and a mapping of the logical memory address ranges to physical addresses on the physical memory devices of the memory pool 1270. The amount of memory provided by the specified memory address ranges correspond to an amount of memory determined from the evaluated memory characteristics. As a result, by assigning access permissions to the compute sled 1230 for one or more memory address ranges, the memory sled 1240 "onlines" the memory to the compute sled 1230, effectively allocating the memory provided by the memory address ranges for the compute sled 1230 to use.

The data writer 1436, in the illustrative embodiment, is configured to write data to the memory 1270 in response to a request (e.g., from a compute sled 1230), provided that the access rights manager 1434 has verified that the compute sled 1230 has permission to have the requested data access operation (e.g., a write operation) performed at an address associated with the request. Similarly, the data reader 1438, in the illustrative embodiment, is configured to read data from the memory 1270 in response to a request (e.g., from a compute sled 1230), provided that the access rights manager 1434 has verified that the compute sled 1230 has permission to have the read operation performed at an address associated with the request.

It should be appreciated that each of the memory mapper 1432, the access rights manager 1434, the data writer 1436, and the data reader 1438 may be separately embodied as hardware, firmware, software, virtualized hardware, emulated architecture, and/or a combination thereof. For example, the memory mapper 1432 and access rights manager 1434 may be embodied as hardware components, while the data writer 1436 and the data reader 1438 are embodied as virtualized hardware components or as some other combination of hardware, firmware, software, virtualized hardware, emulated architecture, and/or a combination thereof.

Figure 15:
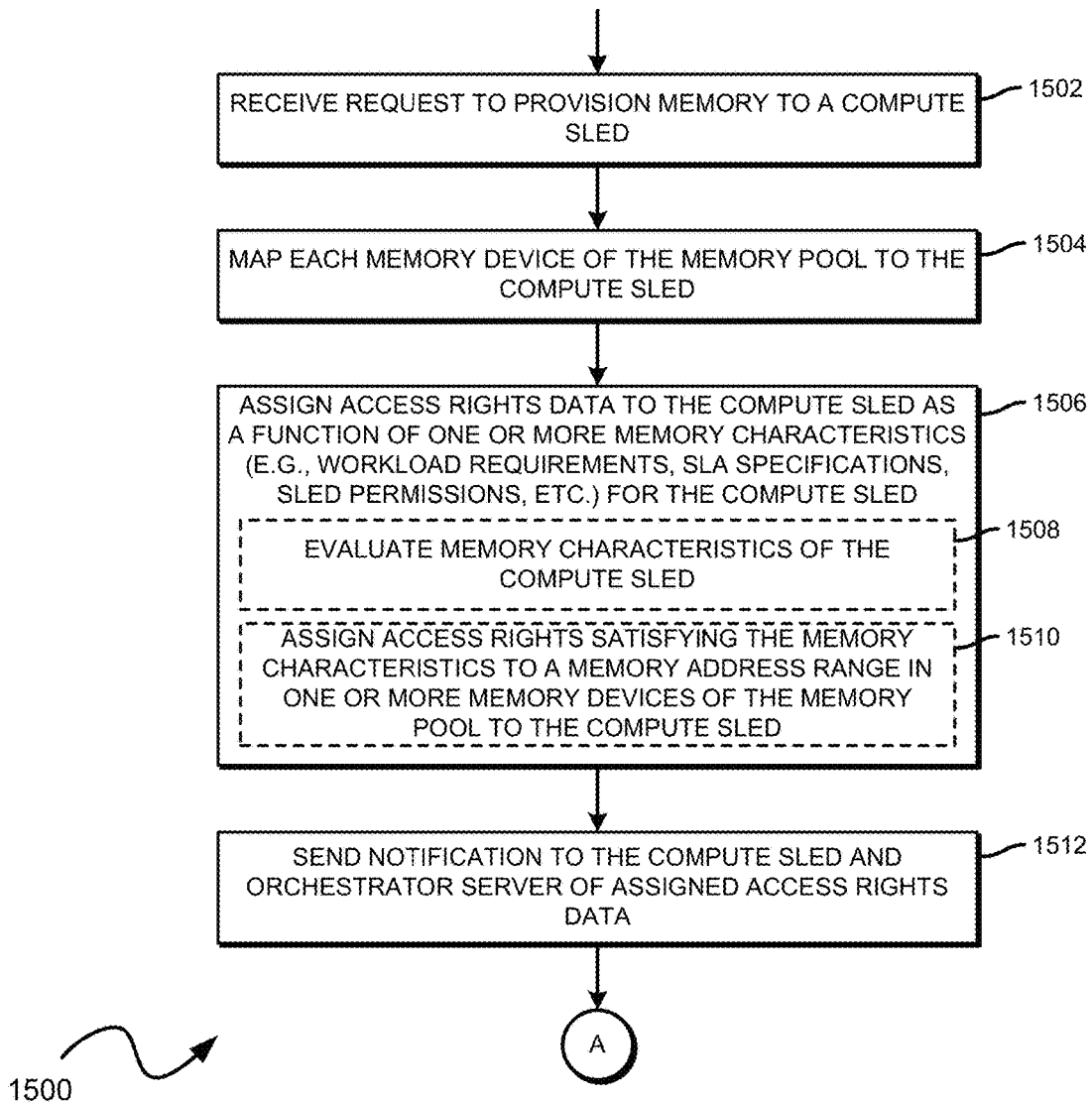
FIGS. 15-17 are a simplified flow diagram of at least one embodiment of a method for managing memory allocation in the sled of FIGS. 12 and 13.

Referring now to FIG. 15, the memory sled 1240, in operation, may execute a method 1500 for managing allocation of memory to a compute sled 1230. In particular, FIG. 15 depicts a method of initially provisioning a compute sled 1230 with memory from the memory pool 1270. As shown, the method 1500 begins in block 1502, where the memory sled 1240 receives a request to provision memory to a compute sled 1230. For instance, in configuring resources on a given compute sled, the orchestrator server 1220 may send the request to the memory sled 1240. The request may include memory characteristics associated with the compute sled 1230, such as an amount of memory to provision, memory requirements for a workload to be processed by the compute sled 1230, SLA specifications, sled permissions, and the like.

In block 1504, the memory sled 1240 maps the entire memory pool 1270 to the compute sled 1230. More particularly, the memory sled 1240 maps each byte-addressable memory device 1272 in the memory pool 1270 to the compute sled 1230. For instance, to do so, the memory sled 1240 may modify the memory map data 1402 to associate the compute sled 1230 (e.g., by a value identifying the compute sled 1230, such as a media access control (MAC) address, an internet protocol (IP) address, or other identifier) with memory address regions in each memory device 1272. The memory sled 1240 may also return logical addressing data to the compute sled 1230 indicative of logical addresses exposed by the memory pool 1270. In the illustrative embodiment, each logical address is associated with a corresponding physical address of a memory device 1272. While the memory sled 1240 maps the entire memory pool 1270, the compute sled 1230 may be unable to access certain memory addresses due to a lack of access permissions (e.g., read or write permissions).

In block 1506, the memory sled 1240 assigns access rights data 1404 to the compute sled as a function of memory characteristics for the compute sled 1230. As stated above, the memory characteristics may be included with the request to provision memory. In block 1508, the memory sled 1240 evaluates the memory characteristics of the compute sled 1230. Doing so allows the memory sled 1240 to determine an amount of memory to allocate to the compute sled 1230. The memory sled 1240 may also evaluate the memory capacity of the memory pool 1270 to determine whether the memory pool 1270 has sufficient memory to allocate in response to the request. The memory sled 1240 may return an error if the available memory is insufficient to satisfy the request. In block 1510, the memory sled 1240 assigns access rights satisfying the memory characteristics to one or more address ranges in the memory pool 1270 to the compute sled 1230. More particularly, the memory sled 1240 modifies the access rights data 1404 to assign read and/or write permissions to memory regions of the memory pool 1270 that conform to the memory characteristics of the compute sled 1230.

In block 1512, the memory sled 1230 sends a notification to the orchestrator server 1220 of the assigned access rights data to the memory address ranges. For example, the memory sled 1240 may send, through the network 1212, a message indicative of the notification. The notification may include logical addresses associated with the accessible memory address ranges. In turn, the orchestrator server 1220 may notify the compute sled 1230 of the memory allocation. Further, the orchestrator server 1220 may track the memory allocation using the notification.

Figure 16:
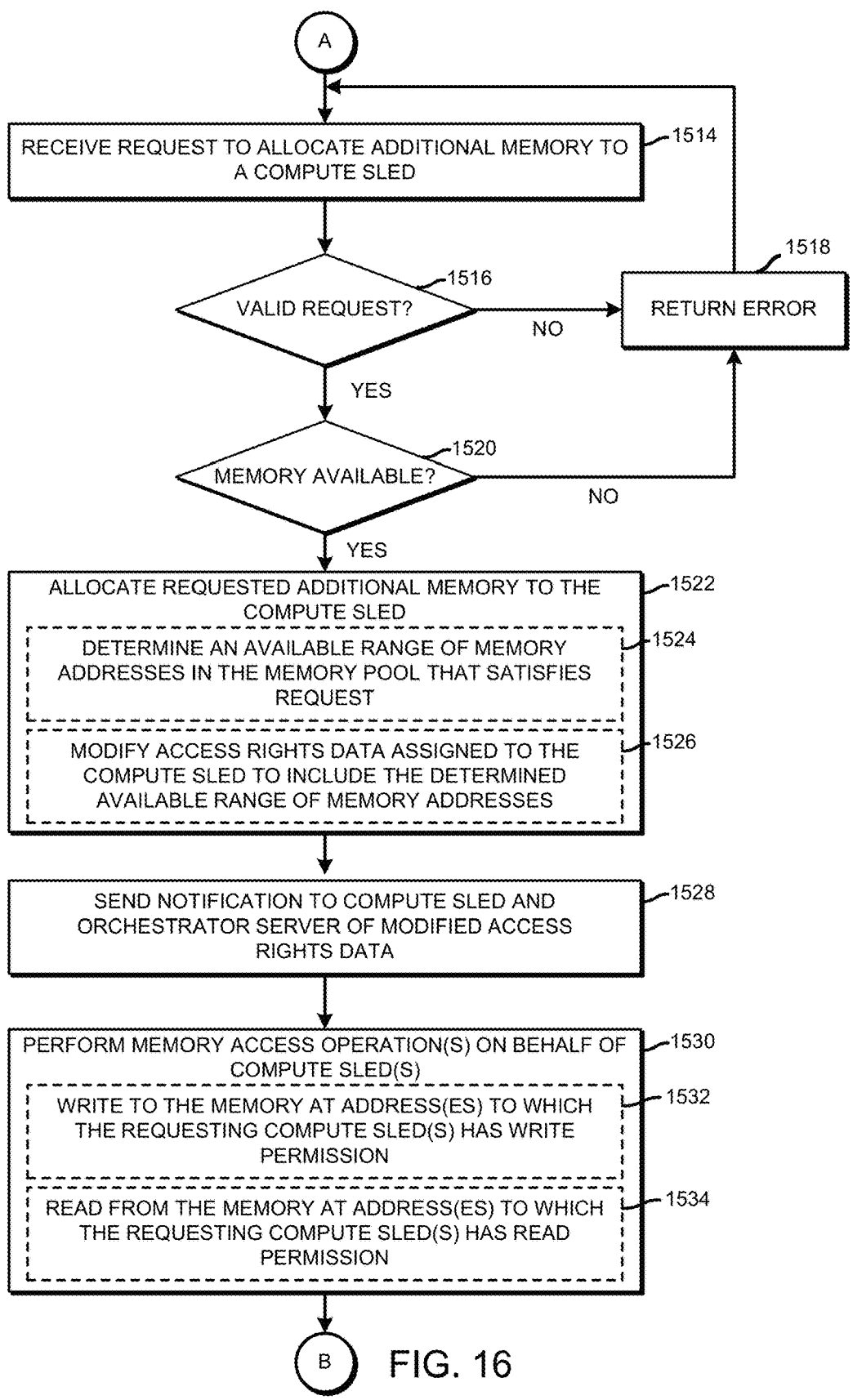

Once provisioned, the orchestrator server 1220 on may request additional memory capacity for allocation on the compute sled 1230. For example, the orchestrator server 1220 may determine that the workload executed by the compute sled 1230 would benefit from memory capacity at various stages of a workload that is not presently provisioned to the compute sled 1230 for efficient utilization. Referring now to FIG. 16, the memory sled 1240 may, in operation, dynamically allocate additional memory to the compute sled 1230 as requested. In block 1514, the memory sled 1240 receives a request to allocate additional memory to the compute sled 1230. The request may indicate the amount of additional memory to allocate as well as additional information, such as an identifier associated with the compute sled 1230. In block 1516, the memory sled 1240 may verify parameters of the request to ensure that the request is valid. For example, the memory sled 1240 may evaluate memory presently allocated to the compute sled 1230 to determine whether the allocated amount is within specifications of an associated SLA and whether an allocation of additional memory would exceed the specifications. If the request is invalid, then in block 1518, the memory sled 1240 returns an error to the requesting compute device (e.g., to the compute sled 1230). Otherwise, in block 1520, the memory sled 1240 determines whether the requested amount of memory is available. To do so, the memory sled 1240 may evaluate the memory map data 1402 relative to the access rights data 1404 to determine available memory. The memory sled 1240 may also evaluate unused memory regions currently allocated to other compute sleds 1230 and determine, based on memory characteristics of that compute sled 1230, whether the memory sled 1240 can reduce the amount of allocated memory for that compute sled 1230. For example, the memory sled 1240 may evaluate a present memory utilization of that compute sled 1230 to determine whether the utilization falls below a specified threshold. If so, the memory sled 1240 may determine to apportion a given amount of the unused memory for subsequent allocation to the compute sled 1230. In other cases, the orchestrator server 1220 may cause the memory sled 1240 to reduce an allocation of memory from another compute sled in the system 1210. If memory is unavailable to allocate to the compute sled 1230, in block 1518, the memory sled 1240 returns an error to the requesting compute device.

However, if the memory pool 1270 has available memory, in block 1522, the memory sled 1240 allocates the requested memory to the compute sled 1230. In particular, in block 1524, the memory sled 1240 determines an available range (or ranges) of memory addresses in the memory pool 1270 that satisfies the request. To do so, the memory sled 1240 may evaluate the memory map data 1402 relative to the access rights data 1404 and determine ranges of memory addresses that are not presently allocated to other compute sleds 1230. In block 1526, the memory sled 1240 modifies the access rights data 1404 associated with the compute sled 1230 to include the determined available ranges of memory.

In block 1528, the memory sled 1240 sends a notification to the compute sled 1230 and the orchestrator server 1220 of the modified access rights data. By onlining the additional memory via access permissions, the amount of byte-addressable memory in the memory pool 1270 available to a given compute sled 1230 can be adjusted more quickly than in a typical allocation or deallocation process. In block 1530, the memory sled 1240 performs one or more memory access operations on behalf of the compute sled 1230. In block 1532, the memory sled 1240 writes to the memory at an address (or addresses) to which the requesting compute sled 1230 has write permission according to the access rights data 1404 associated with the compute sled 1230. As indicated in block 1534, the memory sled 1240 may read from the memory at an address (or addresses) to which the compute sled 1230 has read permission according to the access rights data 1404.

Figure 17:
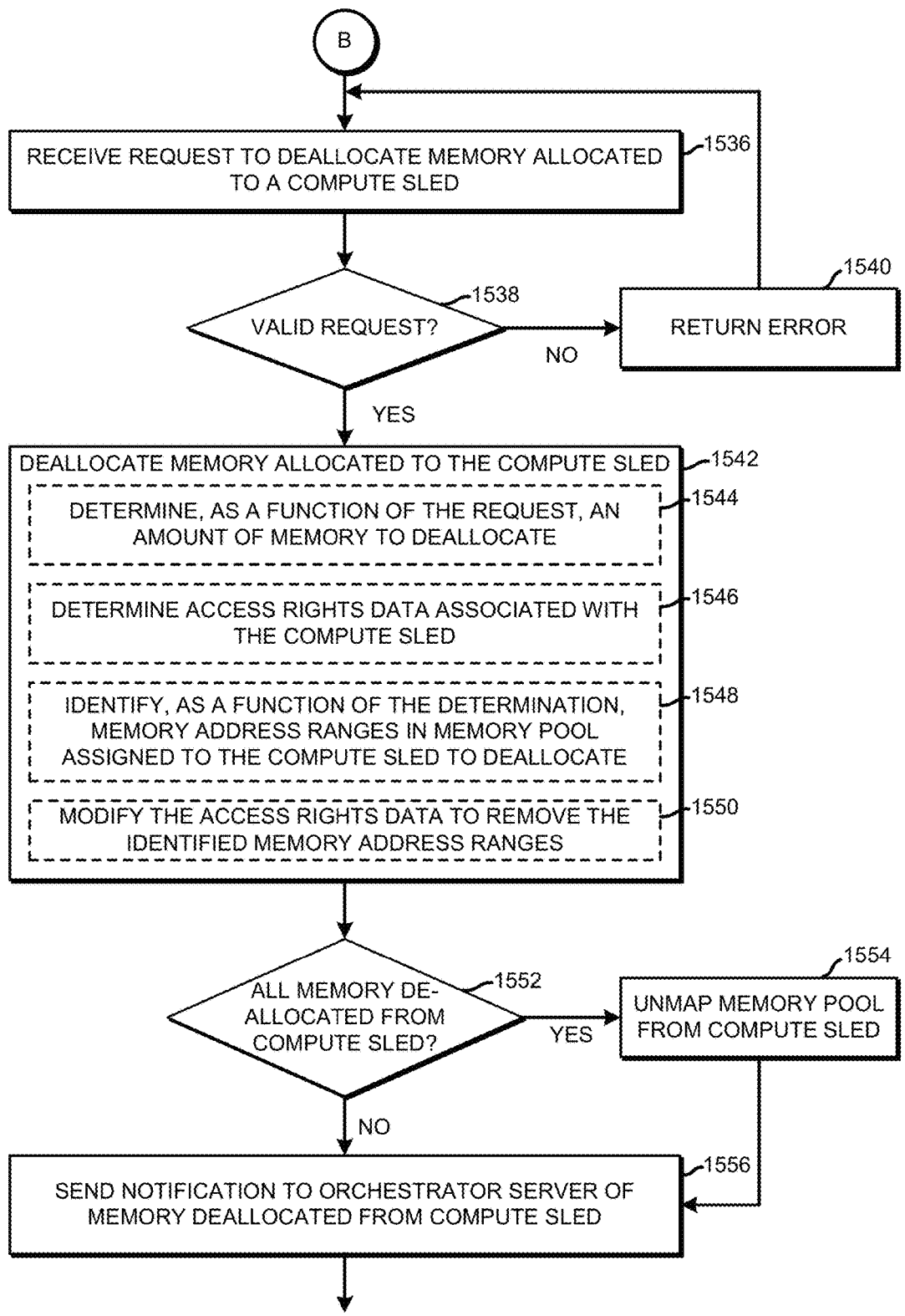

The memory sled 1240 may manage the allocation of memory capacity of a compute sled 1230 on an as requested basis. For example, the memory sled 1240 may deallocate memory assigned to a given compute sled 1230 in some cases, such as when the compute sled 1230 no longer requires a given amount of memory or when the compute sled 1230 goes offline. Referring now to FIG. 17, the memory sled 1240, in operation, may deallocate memory of the memory pool 1270 presently allocated to a compute sled 1230. In block 1536, the memory sled 1240 receives a request to deallocate memory allocated to a compute sled 1230. For example, the orchestrator server 1220 may send the request upon determining that memory utilization falls below a specified threshold. As another example, the orchestrator server 1220 may send the request upon taking the corresponding compute sled 1230 offline. In another example, the compute sled 1230 may determine that the workload is entering a phase of execution that will use comparatively less byte-addressable memory than before, and send a corresponding request to the memory sled 1240 (or to the orchestrator server 1220) to deallocate a portion of the byte-addressable memory that was previously allocated to the compute sled 1230. Depending on the situation, the request may indicate an amount of memory to deallocate or indicate to deallocate all of the presently allocated memory of the compute sled 1230. In block 1538, the memory sled 1240 determines whether the request is valid, in a process similar to that of block 1516, and if not valid, returns an error, as indicated in block 1540. Otherwise, the method 1500 advances to block 1542, in which the memory sled 1240 deallocates memory that was previously allocated to the compute sled 1230.

In block 1544, the memory sled 1240 determines, as a function of the request, an amount of memory to deallocate. As described above, the request may indicate an amount of memory to deallocate from the compute sled 1230. For instance, the orchestrator server 1220 may determine the amount of memory based on a present utilization of the compute sled 1230 and specify that amount in the request. In some cases, the request may include other attributes, such as a present memory utilization of the compute sled. In such a case, the memory sled 1240 may directly determine the amount of memory to deallocate based on the utilization. In block 1546, the memory sled 1240 determines access rights data associated with the compute sled 1230. Doing so allows the memory sled 1240 to determine which memory address ranges in the memory pool 1270 are presently assigned to the compute sled 1230. In block 1548, the memory sled 1240 identifies, as a function of the determination, one or more memory address ranges in the memory pool assigned to the compute sled to deallocate. For example, the memory sled 1240 may identify an amount of unused memory within the memory address ranges assigned to the compute sled 1230 as a candidate for deallocation. The memory sled 1240 may also evaluate a timestamp indicating when a memory address range associated with the compute sled 1230 was last accessed and determine, based on the timestamp, whether the range is a candidate for deallocation. In block 1550, the memory sled 1240 modifies the access rights data 1404 associated with the compute sled 1230 to remove permissions to identified memory address ranges from the compute sled 1230.

In block 1552, the memory sled 1240 may determine whether all memory address ranges were deallocated from the compute sled 1230. For example, all memory address ranges may be deallocated in the event that a compute sled 1230 is taken offline. If so, then in block 1554, the memory sled 1240 unmaps the memory pool 1270 from the compute sled 1230. More particularly, the memory sled 1240 modifies the memory map data 1402 to remove access to the memory pool 1270 by the compute sled 1230. In block 1556, the memory sled 1240 sends a notification to the orchestrator server 1220 of the deallocation.

Examples

Illustrative examples of the technologies disclosed herein are provided below. An embodiment of the technologies may include any one or more, and any combination of, the examples described below.

Example 1 includes a memory sled, comprising a memory pool comprising one or more byte-addressable memory devices; a memory pool controller coupled to the memory pool, wherein the memory pool controller is to receive a request to provision memory to a compute sled, map, in response to the request, each of the memory devices of the memory pool to the compute sled, and assign access rights to the compute sled as a function of one or more memory characteristics of the compute sled, wherein the memory characteristics are indicative of an amount of memory in the memory pool to be used by the compute sled, and wherein the access rights are indicative of access permissions to one or more memory address ranges associated with the one or more memory devices to provide access to the amount of memory to the compute sled.

Example 2 includes the subject matter of Example 1, and wherein the memory pool controller is further to send a notification to the compute sled of the assigned access rights.

Example 3 includes the subject matter of any of Examples 1 and 2, and wherein to assign the access rights to the compute sled comprises to evaluate the one or more memory characteristics of the compute sled; and assign the access rights based on the evaluation, wherein the access rights satisfy the evaluated one or more memory characteristics.

Example 4 includes the subject matter of any of Examples 1-3, and wherein the one or more memory characteristics includes at least one of memory requirements for a workload, specifications provided as a service level agreement, or memory access permissions of the compute sled.

Example 5 includes the subject matter of any of Examples 1-4, and wherein the memory pool controller is further to receive a request to allocate additional memory to the compute sled; and allocate the additional memory to the compute sled.

Example 6 includes the subject matter of any of Examples 1-5, and wherein to allocate the additional memory to the compute sled is to determine an available memory address range in the one or more memory address ranges that satisfies the request to allocate the additional memory; and modify the access rights to provide access permissions to the determined available memory address range.

Example 7 includes the subject matter of any of Examples 1-6, and wherein the memory pool controller is further to send a notification to the compute sled indicative of the modified access rights.

Example 8 includes the subject matter of any of Examples 1-7, and wherein the memory pool controller is further to receive a request to deallocate the memory allocated, from the memory pool, to the compute sled; and deallocate the memory allocated to the compute sled.

Example 9 includes the subject matter of any of Examples 1-8, and wherein to deallocate the memory comprises to determine, as a function of the request, an amount of memory to deallocate from the compute sled; and determine the access rights associated with the compute sled.

Example 10 includes the subject matter of any of Examples 1-9, and wherein to deallocate the memory further comprises to identify, as a function of the determination of the amount of memory to deallocate and the access rights, one or more memory address ranges in the memory pool to deallocate; and modify the access rights to remove access permissions to the identified one or more memory address ranges.

Example 11 includes the subject matter of any of Examples 1-10, and wherein the memory pool controller is further to unmap each of the memory devices from the compute sled.

Example 12 includes the subject matter of any of Examples 1-11, and wherein the memory pool controller is further to send a notification to an orchestrator server of the deallocation.

Example 13 includes the subject matter of any of Examples 1-12, and wherein the memory pool controller is further to determine whether the request to deallocate the memory is valid.

Example 14 includes the subject matter of any of Examples 1-13, and wherein to assign the access rights comprises to assign write permissions to one or more of the memory address ranges.

Example 15 includes the subject matter of any of Examples 1-14, and wherein to assign the access rights comprises to assign read permissions to one or more of the memory address ranges.

Example 16 includes a method comprising receiving, by a memory sled, a request to provision memory to a compute sled; mapping, by the memory sled in response to the request, each of one or more byte-addressable memory devices of a memory pool to the compute sled; and assigning, by the memory sled, access rights to the compute sled as a function of one or more memory characteristics of the compute sled, wherein the memory characteristics are indicative of an amount of memory in the memory pool to be used by the compute sled, and wherein the access rights are indicative of access permissions to one or more memory address ranges associated with the one or more memory devices to provide access to the amount of memory to the compute sled.

Example 17 includes the subject matter of Example 16, and further including sending, by the memory sled, a notification to the compute sled of the assigned access rights.

Example 18 includes the subject matter of any of Examples 16 and 17, and wherein assigning the access rights to the compute sled comprises evaluating the one or more memory characteristics of the compute sled; and assigning the access rights based on the evaluation, wherein the access rights satisfy the evaluated one or more memory characteristics.

Example 19 includes the subject matter of any of Examples 16-18, and wherein the one or more memory characteristics includes at least one of memory requirements for a workload, specifications provided as a service level agreement, or memory access permissions of the compute sled.

Example 20 includes the subject matter of any of Examples 16-19, and further including receiving, by the memory sled, a request to allocate additional memory to the compute sled; and allocating, by the memory sled, the additional memory to the compute sled.

Example 21 includes the subject matter of any of Examples 16-20, and wherein allocating the additional memory to the compute sled comprises determining an available memory address range in the one or more memory address ranges that satisfies the request to allocate the additional memory; and modifying the access rights to provide access permissions to the determined available memory address range.

Example 22 includes the subject matter of any of Examples 16-21, and further including receiving, by the memory sled, a request to deallocate the memory allocated from the memory pool, to the compute sled; and deallocating, by the memory sled, the memory allocated to the compute sled.

Example 23 includes the subject matter of any of Examples 16-22, and wherein deallocating the memory comprises determining, as a function of the request, an amount of memory to deallocate from the compute sled; and determining the access rights associated with the compute sled.

Example 24 includes the subject matter of any of Examples 16-23, and wherein deallocating the memory further comprises identifying, as a function of the determination of the amount of memory to deallocate and the access rights, one or more memory address ranges in the memory pool to deallocate; and modifying the access rights to remove access permissions to the identified one or more memory address ranges.

Example 25 includes the subject matter of any of Examples 16-24, and further including unmapping, by the memory sled, each of the memory devices from the compute sled.

Example 26 includes the subject matter of any of Examples 16-25, and further including sending, by the memory sled, a notification to an orchestrator server of the deallocation.

Example 27 includes the subject matter of any of Examples 16-26, and further including determining, by the memory sled, whether the request to deallocate the memory is valid.

Example 28 includes the subject matter of any of Examples 16-27, and wherein assigning the access rights comprises assigning write permissions to one or more of the memory address ranges.

Example 29 includes the subject matter of any of Examples 16-28, and wherein assigning the access rights comprises assigning read permissions to one or more of the memory address ranges.

Example 30 includes one or more machine-readable storage media comprising a plurality of instructions stored thereon that, in response to being executed, cause a memory sled to perform the method of any of Examples 16-29.

Example 31 includes a memory sled comprising means for performing the method of any of Examples 16-29.

Example 32 includes a memory sled comprising a compute engine to perform the method of any of Examples 16-29.

Example 33 includes a memory sled comprising means for receiving a request to provision memory to a compute sled; means for mapping, in response to the request, each of one or more byte-addressable memory devices of a memory pool to the compute sled; and means for assigning access rights to the compute sled as a function of one or more memory characteristics of the compute sled, wherein the memory characteristics are indicative of an amount of memory in the memory pool to be used by the compute sled, and wherein the access rights are indicative of access permissions to one or more memory address ranges associated with the one or more memory devices to provide access to the amount of memory to the compute sled.

Example 34 includes the subject matter of Example 33, and further including means for sending a notification to the compute sled of the assigned access rights.

Example 35 includes the subject matter of any of Examples 33 and 34, and wherein the means for assigning the access rights to the compute sled comprises means for evaluating the one or more memory characteristics of the compute sled; and means for assigning the access rights based on the evaluation, wherein the access rights satisfy the evaluated one or more memory characteristics.

Example 36 includes the subject matter of any of Examples 33-35, and wherein the one or more memory characteristics includes at least one of memory requirements for a workload, specifications provided as a service level agreement, or memory access permissions of the compute sled.

Example 37 includes the subject matter of any of Examples 33-36, and further including means for receiving a request to allocate additional memory to the compute sled; and means for allocating the additional memory to the compute sled.

Example 38 includes the subject matter of any of Examples 33-37, and wherein the means for allocating the additional memory to the compute sled comprises means for determining an available memory address range in the one or more memory address ranges that satisfies the request to allocate the additional memory; and means for modifying the access rights to provide access permissions to the determined available memory address range.

Example 39 includes the subject matter of any of Examples 33-38, and further including means for sending a notification to the compute sled indicative of the modified access rights.

Example 40 includes the subject matter of any of Examples 33-39, and further including means for receiving a request to deallocate the memory allocated from the memory pool, to the compute sled; and means for deallocating the memory allocated to the compute sled.

Example 41 includes the subject matter of any of Examples 33-40, and wherein the means for deallocating the memory comprises means for determining, as a function of the request, an amount of memory to deallocate from the compute sled; and means for determining the access rights associated with the compute sled.

Example 42 includes the subject matter of any of Examples 33-41, and wherein the means for deallocating the memory further comprises means for identifying, as a function of the determination of the amount of memory to deallocate and the access rights, one or more memory address ranges in the memory pool to deallocate; and means for modifying the access rights to remove access permissions to the identified one or more memory address ranges.

Example 43 includes the subject matter of any of Examples 33-42, and further including means for unmapping each of the memory devices from the compute sled.

Example 44 includes the subject matter of any of Examples 33-43, and further including means for sending a notification to an orchestrator server of the deallocation.

Example 45 includes the subject matter of any of Examples 33-44, and further including means for determining whether the request to deallocate the memory is valid.

Example 46 includes the subject matter of any of Examples 33-45, and wherein the means for assigning the access rights comprises assigning write permissions to one or more of the memory address ranges.

Example 47 includes the subject matter of any of Examples 33-46, and wherein the means for assigning the access rights comprises assigning read permissions to one or more of the memory address ranges.

The invention claimed is:

1. A memory sled, comprising:
a memory pool comprising one or more byte-addressable memory devices;
a memory pool controller coupled to the memory pool, wherein the memory pool controller is to:
receive a request to provision memory to a compute sled,
map, in response to the request, each of the memory devices of the memory pool to the compute sled, and
assign access rights to the compute sled as a function of one or more memory characteristics of the compute sled, wherein the memory characteristics are indicative of an amount of memory in the memory pool to be used by the compute sled, and wherein the access rights are indicative of access permissions to one or more memory address ranges associated with the one or more memory devices to provide access to the amount of memory to the compute sled.

2. The memory sled of claim 1, wherein the memory pool controller is further to send a notification to the compute sled of the assigned access rights.

3. The memory sled of claim 1, wherein to assign the access rights to the compute sled comprises to:
evaluate the one or more memory characteristics of the compute sled; and
assign the access rights based on the evaluation, wherein the access rights satisfy the evaluated one or more memory characteristics.

4. The memory sled of claim 3, wherein the one or more memory characteristics includes at least one of memory requirements for a workload, specifications provided as a service level agreement, or memory access permissions of the compute sled.

5. The memory sled of claim 1, wherein the memory pool controller is further to:
receive a request to allocate additional memory to the compute sled; and
allocate the additional memory to the compute sled.

6. The memory sled of claim 5, wherein to allocate the additional memory to the compute sled is to:
determine an available memory address range in the one or more memory address ranges that satisfies the request to allocate the additional memory; and
modify the access rights to provide access permissions to the determined available memory address range.

7. The memory sled of claim 6, wherein the memory pool controller is further to send a notification to the compute sled indicative of the modified access rights.

8. The memory sled of claim 1, wherein the memory pool controller is further to:
receive a request to deallocate the memory allocated, from the memory pool, to the compute sled; and
deallocate the memory allocated to the compute sled.

9. The memory sled of claim 8, wherein to deallocate the memory comprises to:
determine, as a function of the request, an amount of memory to deallocate from the compute sled; and
determine the access rights associated with the compute sled.

10. The memory sled of claim 9, wherein to deallocate the memory further comprises to:
identify, as a function of the determination of the amount of memory to deallocate and the access rights, one or more memory address ranges in the memory pool to deallocate; and
modify the access rights to remove access permissions to the identified one or more memory address ranges.

11. The memory sled of claim 8, wherein the memory pool controller is further to unmap each of the memory devices from the compute sled.

12. The memory sled of claim 8, wherein the memory pool controller is further to send a notification to an orchestrator server of the deallocation.

13. One or more non-transitory machine-readable storage media comprising a plurality of instructions stored thereon that, in response to being executed, cause a memory sled to:
receive a request to provision memory to a compute sled;
map, in response to the request, each of one or more byte-addressable memory devices of a memory pool to the compute sled; and
assign access rights to the compute sled as a function of one or more memory characteristics of the compute sled, wherein the memory characteristics are indicative of an amount of memory in the memory pool to be used by the compute sled, and wherein the access rights are indicative of access permissions to one or more memory address ranges associated with the one or more memory devices to provide access to the amount of memory to the compute sled.

14. The one or more machine-readable storage media of claim 13, wherein the plurality of instructions further cause the memory sled to send a notification to the compute sled of the assigned access rights.

15. The one or more machine-readable storage media of claim 13, wherein to assign the access rights to the compute sled comprises to:
evaluate the one or more memory characteristics of the compute sled; and assign the access rights based on the evaluation, wherein the access rights satisfy the evaluated one or more memory characteristics.

16. The one or more machine-readable storage media of claim 15, wherein the one or more memory characteristics includes at least one of memory requirements for a workload, specifications provided as a service level agreement, or memory access permissions of the compute sled.

17. The one or more machine-readable storage media of claim 13, wherein the plurality of instructions further cause the memory sled to:
receive a request to allocate additional memory to the compute sled; and
allocate the additional memory to the compute sled.

18. The one or more machine-readable storage media of claim 17, wherein to allocate the additional memory to the compute sled comprises to:
determine an available memory address range in the one or more memory address ranges that satisfies the request to allocate the additional memory; and
modify the access rights to provide access permissions to the determined available memory address range.

19. The one or more machine-readable storage media of claim 17, wherein the plurality of instructions further cause the memory sled to:
receive a request to deallocate the memory allocated from the memory pool, to the compute sled; and
deallocate the memory allocated to the compute sled.

20. The one or more machine-readable storage media of claim 19, wherein to deallocate the memory comprises to:
determine, as a function of the request, an amount of memory to deallocate from the compute sled; and
determine the access rights associated with the compute sled.

21. The one or more machine-readable storage media of claim 20, wherein to deallocate the memory further comprises to:
identify, as a function of the determination of the amount of memory to deallocate and the access rights, one or more memory address ranges in the memory pool to deallocate; and
modify the access rights to remove access permissions to the identified one or more memory address ranges.

22. The one or more machine-readable storage media of claim 19, wherein the plurality of instructions further cause the memory sled to unmap each of the memory devices from the compute sled.

23. A method comprising:
receiving, by a memory sled, a request to provision memory to a compute sled;
mapping, by the memory sled in response to the request, each of one or more byte-addressable memory devices of a memory pool to the compute sled; and
assigning, by the memory sled, access rights to the compute sled as a function of one or more memory characteristics of the compute sled, wherein the memory characteristics are indicative of an amount of memory in the memory pool to be used by the compute sled, and wherein the access rights are indicative of access permissions to one or more memory address ranges associated with the one or more memory devices to provide access to the amount of memory to the compute sled.

24. The method of claim 23, wherein assigning the access rights to the compute sled comprises:
evaluating the one or more memory characteristics of the compute sled; and
assigning the access rights based on the evaluation, wherein the access rights satisfy the evaluated one or more memory characteristics.

25. The method of claim 23, wherein the one or more memory characteristics includes at least one of memory requirements for a workload, specifications provided as a service level agreement, or memory access permissions of the compute sled.

* * * * *